United States Patent [19]
Mota et al.

[11] Patent Number: 5,344,293
[45] Date of Patent: Sep. 6, 1994

[54] DOUBLE DIAPHRAGM LEAKPROOF SEALING DEVICE FOR ELECTRIC WINDSCREEN WASHER PUMPS

[75] Inventors: Miguel Mota, Rubi; José L. Morales, Barcelona, both of Spain

[73] Assignee: Transpar Iberica S.A., Rubi, Spain

[21] Appl. No.: 923,904

[22] PCT Filed: Dec. 11, 1991

[86] PCT No.: PCT/ES91/00085

§ 371 Date: Aug. 19, 1992

§ 102(e) Date: Aug. 19, 1992

[87] PCT Pub. No.: WO92/11150

PCT Pub. Date: Jul. 9, 1992

[30] Foreign Application Priority Data

Dec. 21, 1990 [ES] Spain ................... 9003268
Sep. 24, 1991 [ES] Spain ................... 9102106

[51] Int. Cl.$^5$ ................... F01D 1/30; G05D 11/00
[52] U.S. Cl. ................... 417/442; 415/911; 415/146; 137/119
[58] Field of Search ........... 417/315, 442; 415/911, 415/146; 137/87, 118, 119

[56] References Cited

U.S. PATENT DOCUMENTS

| | | | |
|---|---|---|---|
| 2,246,621 | 6/1941 | Davis | 137/118 |
| 3,614,965 | 10/1971 | Metivier | 137/119 |
| 3,895,643 | 7/1975 | Ward | 137/119 |
| 4,600,361 | 7/1986 | Bianco | 415/911 |
| 4,679,983 | 7/1987 | Pietryk et al. | 415/911 |
| 4,728,260 | 3/1988 | Ishii | 417/442 |
| 5,186,606 | 2/1993 | Egner-Walter et al. | 417/442 |

FOREIGN PATENT DOCUMENTS

| | | | |
|---|---|---|---|
| 0145672 | 6/1985 | European Pat. Off. | |
| 0234802 | 9/1987 | European Pat. Off. | |
| 0282911 | 9/1988 | European Pat. Off. | |
| 0336112 | 10/1989 | European Pat. Off. | |
| 8620253 | 10/1986 | Fed. Rep. of Germany | |
| 3917698 | 12/1989 | Fed. Rep. of Germany | |
| 1142593 | 9/1957 | France | 415/146 |
| 2654470 | 5/1991 | France | |
| 3442907 | 6/1986 | Netherlands | 415/146 |
| 287059 | 5/1985 | Spain | |
| 2202133 | 9/1988 | United Kingdom | |

*Primary Examiner*—Richard A. Bertsch
*Assistant Examiner*—Roland G. McAndrews, Jr.
*Attorney, Agent, or Firm*—Michael J. Striker

[57] ABSTRACT

A double diaphragm leakproof sealing device for electric windscreen washer pumps has a directing chamber housing two very resilient diaphragms which may be provided with compensating elements for loss of resilience. When there is no leaning liquid pressure, the two diaphragms permanently block, by way of their own resilient action and, as the case may be, by the action of the resilience loss compensating elements, the corresponding discharge ports of the chamber. Depending on the direction of rotation of the pump impeller, the cleaning liquid will cause the resilient deformation of the corresponding diaphragm, allowing the cleaning liquid to flow through the associated discharge passage. When the impeller stops rotating, the diaphragm reestablishes the sealing action on the discharge port.

5 Claims, 5 Drawing Sheets

DOUBLE DIAPHRAGM LEAKPROOF SEALING DEVICE FOR ELECTRIC WINDSCREEN WASHER PUMPS

BACKGROUND OF THE INVENTION

The present invention relates to a double diaphragm leakproof sealing device for electric windscreen washer pumps which is applicable, in particular, to motor vehicles provided with equipment for cleaning the front and rear glazed surfaces.

It is well known that in motor vehicles provided with equipment for cleaning the said surfaces, such equipment is provided with an electric pump which is coupled to an auxiliary cleaning liquid reservoir and which may be operated at will by the vehicle user. Also known are double acting pumps, i.e. those which operate selectively, by rotating in one direction or the other to direct the liquid flow towards the front of the vehicle or towards the rear. In these cases, the user has available the corresponding control member to be able to select the surface(s) on which the cleaning liquid is to be sprayed and the corresponding operation of the wiper blades associated with said surfaces.

By such selection, the user may spray the cleaning liquid on the windscreen and, even, simultaneously on the headlamps or spray the cleaning liquid on the rear window of the vehicle.

The known double acting pups are provided with a device for directing the cleaning liquid which is aspirated from the auxiliary reservoir by the suction and discharge impeller mounted in such pumps towards one or the other of such surfaces. This directing depends precisely on the direction of rotation applied by the electric drive motor to the suction and discharge impeller.

The known directing devices essentially comprise, in general, a directing chamber housing a diaphragm acting as a sealing valve. The directing chamber is arranged close to the pumping chamber where the pump suction and discharge impeller is housed. Both the pumping and directing chambers are connected together by passages through which the cleaning liquid pumped by the said impeller flows alternately, depending on the direction of rotation of the suction and discharge impeller. The directing chamber is provided with passages for the delivery of the cleaning liquid. The ports of said inlet and outlet passages are located, for each of the directions of rotation of the impeller in respective opposite sides of the directing chamber such as to define a chamber. In the chamber there is housed, intermediate said ports, a diaphragm which, as said above, acts as a stop valve.

The diaphragm is highly resilient. It may be deflected depending on the pressure exerted by the cleaning liquid pumped by the suction and discharge impeller so that, depending on the direction of rotation of said impeller, it blocks one or the other of the ports of the cleaning liquid outlet passages. The cleaning liquid may flow freely through the remaining outlet port towards the corresponding points of use.

Exemplary of said directing devices is Spanish utility model no. 287,059 for "Double directing device for electric windshield washer pumps" which, further to the novel elements characterising it, comprises the operative members described in the foregoing paragraphs.

In general, the known embodiments of directing devices described suffer, as main drawback from the fact that their diaphragm occupies an intermediate position between the said cleaning liquid inlet and outlet passages. When not under pressure from the cleaning liquid, i.e., hen the impeller is not in operation, the diaphragm does not block either of the ports of the outlet passages or blocks only one of them, depending on the form it adopts after each use. Under these conditions, when the auxiliary cleaning liquid reservoir is at a higher level than the nozzles for spraying said liquid on the corresponding surfaces, the liquid flows freely and leaks out for a simple difference of head level, as happens for example, when transporting the vehicle from the works in a steeply inclined position.

Another operative drawback of the known directing devices is that during the early moments of operation of the suction and discharge impeller, the diaphragm is in an indeterminate position and does not produce an effective seal. Thereby the sealing of the corresponding discharge port is imperfect and a certain amount of liquid is discharged therethrough. This means that during the star up time of the pump some cleaning liquid is discharged over a surface or surfaces which the user had not selected for cleaning.

SUMMARY OF THE INVENTION

Accordingly, it is an object of the present invention to provide a double diaphragm leakproof sealing device for electric windscreen washer pumps, which avoids the disadvantages of the prior art.

The leakproof sealing device of the invention comprises known members which include a directing chamber arranged at a short distance from the pumping chamber containing the cleaning liquid suction and a discharge impeller driven by the electric windscreen washer pump. The chambers are in communication over preferably two passages merging independently in the directing chamber. The ports of the preferably two cleaning liquid discharge passages are arranged in the directing chamber in such a way that, in correspondence with the respective inlet ports, they define an intermediate central chamber. The inventive device is characterized in that the intermediate central chamber houses and retains two diaphragms made from highly resilient material, arranged on adjacent the other so as to define in the directing chamber two half chambers in each of which there is located one of the inlet passage ports and the port of the corresponding cleaning liquid discharge passage in such a way that there is no fluid communication between said half chambers across said diaphragms. Each of the diaphragms has, on one side thereof, a convex surface and, on the other side, a concave surface. The convex surface sides are formed with respective axial sealing extensions dimensioned in functional correspondence with the respective discharge passage ports which they face and against which they permanently bear when the cleaning liquid is not being pumped by the suction and discharge impeller. Both diaphragms are arranged in the intermediate central chamber in such a way that the respective concave surfaces thereof are mutually facing at a relatively short distance apart.

The characteristics of the leakproof sealing device of the invention described above overcome the drawbacks of the known directing devices for the cleaning liquid pumped by the suction and discharge impeller of the windscreen washer pumps.

The fact that the axial sealing extensions of both diaphragms mounted in the leakproof sealing device of the invention permanently bear against the ports of the discharge passages when the suction and discharge impeller is not operating prevents the cleaning liquid from flowing by simple difference of head level from the auxiliary reservoir to the liquid spray nozzles for the corresponding surfaces.

Furthermore, the action of the cleaning liquid pumped by the suction and discharge impeller on the diaphragms of the device depends on the direction of rotation of said impeller. When the suction and discharge impeller rotates in one direction, the cleaning liquid is forced into one of the two half chambers defined by the diaphragms of the device according to the invention. This causes the corresponding diaphragm to free the respective cleaning liquid discharge port by resilient deformation from the axial sealing extension formed on the convex surface side of the said diaphragm so that the cleaning liquid can flow through the corresponding discharge passage. Simultaneously, the other diaphragm continues to press against the corresponding discharge port by way of the axial sealing extension thereof. The sealing action is reinforced by the resilient deformation of the diaphragm under the pressure of the cleaning liquid. When the suction and discharge impeller ceases to act on the diaphragm, the latter resiliently recovers the original position thereof, sealing the discharge port.

Rotation of the suction and discharge impeller in the opposite direction to the one described above causes a symmetrical operation of the device leading to the same results, but relating to the other diaphragm and to the corresponding discharge passage.

In this way, operation of the suction and discharge impeller has no effect on the cleaning liquid contained in the discharge passage still blocked by the corresponding diaphragm. This prevents the cleaning liquid from being pumped towards surfaces not selected by the user.

According to the trials that have been performed, the device constructed according to the new features described above is fully satisfactory, but has the drawback of having a rather limited life, which may be negative when it is expected that the windscreen washer device will be subjected to intensive continuous use, in view of the environmental conditions of the places where the vehicle is to be used. In fact, when the device diaphragms reach approximately 3,000 or 4,000 work cycles, the loss of resilience or fatigue of the material forming the diaphragms may prevent correct operation of the said device. This deterioration is caused by using as constituent material of the diaphragms one of those considered to be the most suitable among those currently known, such as among others: silicone rubber; NBR (butadiene-nitrile-acrylic rubber); and, EPDM (ethylene-propylene-diene ter-polymer) rubber.

To overcome this operational limitation, the invention also relates to embodiments specially designed to ensure a long average life for the two diaphragms of the device.

Consequently, according to a further feature of the invention, the device comprises means for compensating the loss of resilience of the two diaphragms of the device. Such compensating means is formed by pressure extensions of preferably essentially cylindrical form which, arranged coaxially relative to the axial sealing extensions of the convex surface sides are formed symmetrically with the concave surface sides of both diaphragms. At the free ends thereof, such pressure extensions are separated apart so that when the cleaning liquid is pumped by the suction and discharge impeller in one direction or the other, the resilient deformation or opening stroke of the corresponding diaphragm during the opening of the associated discharge port is limited by the pressure extension of the other diaphragm opposite thereto. When the suction and discharge impeller is stopped, the resilient deformation or closing stroke of said diaphragm blocking the discharge port is reinforced by the action of auxiliary recovery means.

According to one embodiment, the auxiliary recovery means comprises a compression spring arranged between both diaphragms coaxially relative to the axial sealing extensions on the convex surface sides thereof. The compression spring is permanently compressed with the ends thereof bearing on the respective concave surfaces of the diaphragms. Its working position is fixed by the pressure extensions on the concave surfaces which are wholly or partly inserted in said spring.

According to another embodiment, the auxiliary recovery means comprises, on the axial sealing extensions of the convex surface sides of both diaphragms, respective large axial recesses.

According to another embodiment, the auxiliary recovery means comprises an O-ring arranged in the intermediate central chamber of the directing chamber, between the inner edges of both diaphragms. The O-ring is provided with through holes which, through corresponding holes provided for the purpose in the pump body member, act as an inlet for the atmospheric pressure, establishing a direct communication between the intermediate central chamber and the environment.

It is obvious that the provision of the resilience loss compensating means described does not alter the essential mode of operation of the leakproof sealing device of the invention.

In fact, the start up of the suction and discharge impeller and the consequent pressure of the cleaning liquid will cause the resilient deformation or opening stroke of one or the other of the two diaphragms of the leakproof sealing device, thereby freeing the corresponding discharge port through which the cleaning liquid will freely flow. The resilient deformation or opening stroke is limited by the pressure extension of the other diaphragm opposite thereto. Thereby the resilient deformation is smaller than the resilient deformation produced in the absence of compensating means. Consequently, the constituent material of the diaphragm is subject to less fatigue, lengthening its average life to a great extent.

On the other hand, stoppage of the suction and discharge impeller and the consequent lack of cleaning liquid pressure will cause the resilient deformation or closing stroke of the said diaphragm. The closing action will be reinforced by the operation of any of the auxiliary recovery means whose features have been described in the foregoing paragraphs. Consequently, as happens during the opening stroke, the constituent material of the diaphragm is subject to less fatigue.

In this way, the above described resilience loss compensating means provides the two diaphragms with an average life which is much longer than the average life obtained with such diaphragms when no compensating means is used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

FIGS. 1 and 2 and FIGS. 3 and 4 show, as stated above, respective embodiments of the double diaphragm leakproof sealing device for electric windscreen washer pumps according to the invention. In both embodiments, the leakproof sealing device of the invention comprises a directing chamber CD and two diaphragms, which are identical to one another, and references for differentiation as M1 and M2 in said FIGS. 1 to 4.

Figure 1:
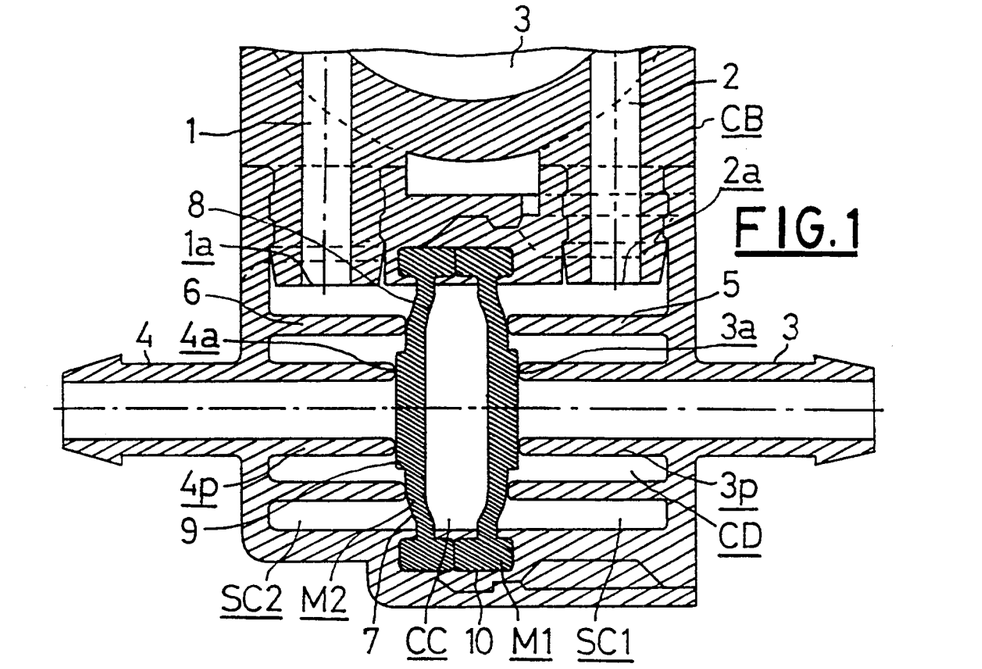
FIG. 1 is a cross section view of one embodiment of the device of the invention.
Figure 2:
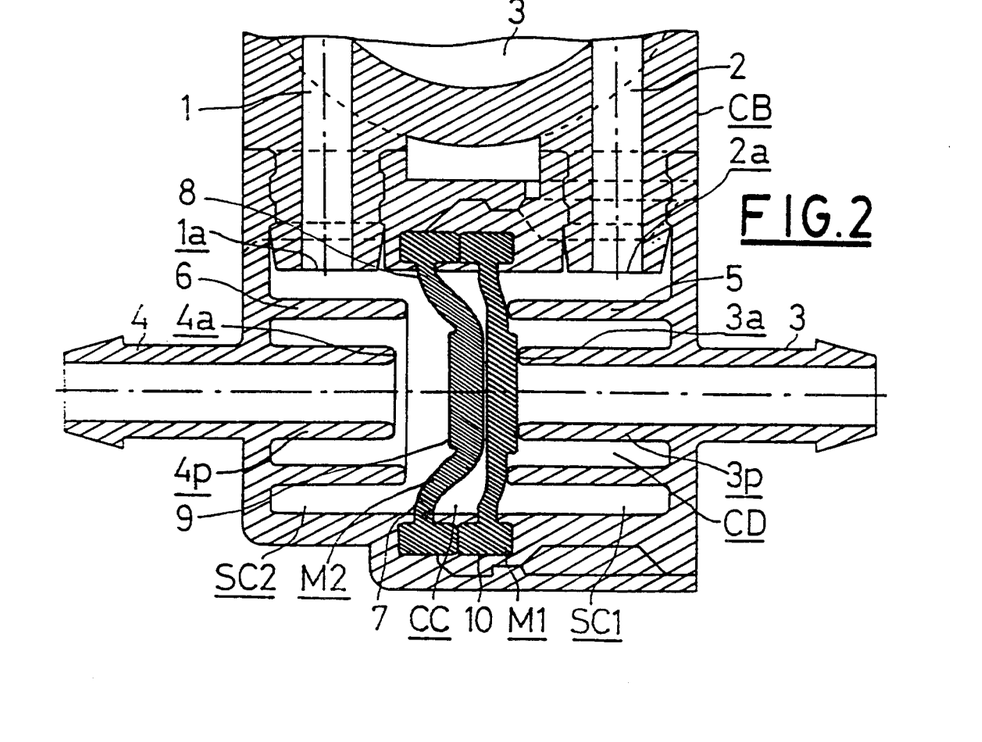
FIG. 2 is a cross section view of the embodiment of the device of the invention shown in FIG. 1 illustrating the action of the cleaning liquid on one of the device's diaphragms.

FIGS. 1 and 2 show one embodiment of the directing chamber CD, corresponding to cases in which the diaphragms M1 and M2 work vertically.

Figure 3:
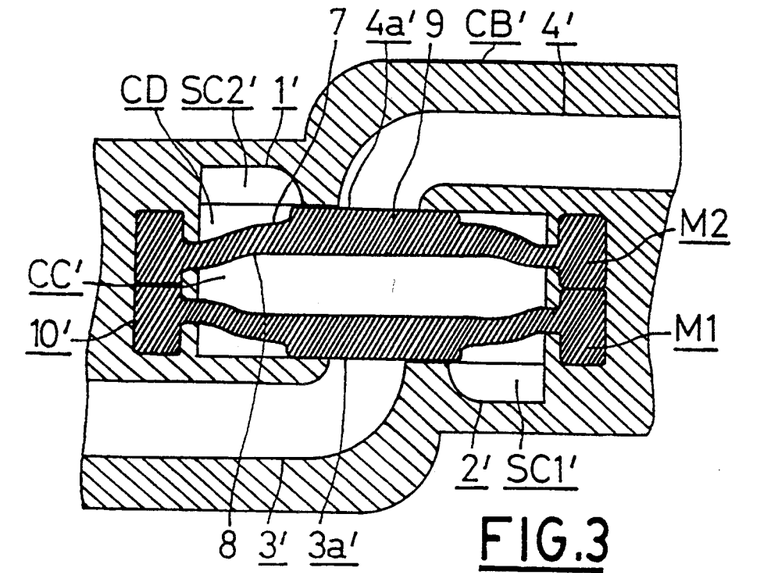
FIG. 3 is a cross section view of a further embodiment of the device of the invention.
Figure 4:
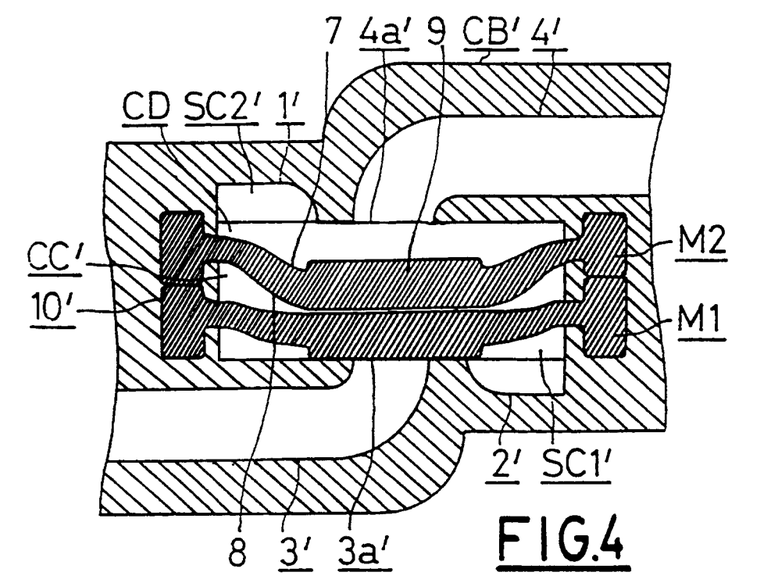
FIG. 4 is a cross section view of the embodiment of the device of the invention shown in FIG. 3 illustrating the action of the cleaning liquid on one of the device's diaphragms.

FIGS. 3 and 4 show another embodiment of the directing chamber CD, which corresponds to cases in which the diaphragms M1 and M2 work horizontally.

Both embodiments of the directing chamber CD of the device of the invention are provided with equivalent elements. These elements for purposes of a clearer explanation, will be identified, both in the description and in the drawing sheets, with the same reference symbol, with the elements of the embodiment of the directing chamber CD shown in FIGS. 3 and 4 being differentiated with the prime (') notation.

FIGS. 1 and 2 show how the directing chamber CD is formed in the interior of one of the ends of the pump body CB which has been shown in part in said Figures. The directing chamber CD is connected, by way of the inlet passages 1 and 2, to the pumping chamber 3 containing the pump suction and discharge impeller which, for a clearer understanding of the description, has not been shown in the drawings.

The passages 1 and 2 are tangential to the pumping chamber A. In the embodiment shown in FIGS. 1 and 2, they are located on the same side of the directing chamber CD where they form respective inlet ports 1a and 2a.

The cleaning liquid pumped by the suction and discharge impeller may flow through said passages 1 and 2. In one of the directions of rotation of the impeller, the cleaning liquid will be forced through one of the passages, 1 or 2, and in the opposite direction of rotation of the impeller, the cleaning liquid will be forced through the other passage.

In this way, the cleaning liquid pumped by the suction and discharge impeller may enter the directing chamber CD through one of the inlet ports, 1a or 2a, but never through both at the same time.

In this embodiment, as shown in FIGS. 1 and 2, the pump body CB is formed with the discharge passages 3 and 4 which are longitudinally aligned. The discharge passages 3 and 4 are extended longitudinally over approximately the same distance into the directing chamber CD by the tubular portions marked 3p and 4p. Their respective ends define corresponding discharge ports 3a and 4a.

The discharge ports 3a and 4a which, as may be seen in the Figures, are opposite each other, have the front edge perpendicular to the longitudinal axis of the discharge passages 3 and 4.

FIGS. 1 and 2 show how the arrangement of the inlet ports 1a and 2a and of the discharge ports 3a and 4a define in the mid-portion of the directing chamber CD a central chamber CC. The diaphragms M1 and M2 of this embodiment of the device of the invention are located in the central chamber.

The tubular portion 3p of the discharge passage 3 and the tubular portion 4p of the discharge passage 4 are concentric in the directing chamber CD with the tubular extensions 5 and 6 formed on the pump body CB. The extensions act as structural reinforcement for pump body CB.

According to the embodiment of the directing chamber CD shown in FIGS. 3 and 4, the chamber CD is also formed on one of the ends of the pump body CB' which has been shown in part in said Figures. The directing chamber CD is connected to the chamber containing the suction and discharge impeller, which have not been shown in said FIGS. 3 and 4 for the same reasons as given above, by the inlet passages 1' and 2' formed in said directing chamber CD on the opposed top and bottom sides thereof.

Like in the embodiment of the directing chamber CD shown in FIGS. 1 and 2, the cleaning liquid pumped by the suction and discharge impeller may flow through said passages 1' and 2'. Depending on the direction of rotation of said impeller, the cleaning liquid will be pumped through one or other of said passages, but never through both at the same time.

In this embodiment of the directing chamber CD shown in FIGS. 3 and 4, the discharge passages 3' and 4' formed in the pump body CB' are provided with respective discharge ports 3a' and 4a' which are opposite each other and are longitudinally aligned.

FIGS. 3 and 4 show how the inlet passages 1' and 2' and the discharge ports 3a' and 4a' are arranged in such a way as to define in the mid-portion of the directing chamber CD the central chamber CC'. The diaphragms M1 and M2 of this embodiment of the device of the invention are located in the central chamber.

According to the embodiment of the directing chamber CD shown in FIGS. 1 and 2, the cleaning liquid pumped by the suction and discharge impeller follows, for one of the directions of rotation of the impeller, the path determined by the inlet passage 1, the chamber CD and the discharge passage 4. For the other direction of rotation of the impeller, it follows the path determined by the inlet passage 2, the chamber CD and the discharge passage 3.

According to the embodiment of the directing chamber CD shown in FIGS. 3 and 4, the cleaning liquid pumped by the suction and discharge impeller follows, for one of the directions of rotation of the impeller, the path determined by the inlet passage 1', the chamber CD and the discharge passage 4'. For the other direction of rotation of the impeller, it follows the path determined by the inlet passage 2', the chamber CD and the discharge passage 3'.

The above described operation of the directing chamber CD is known. The chamber CD may take any other shape appropriate for the needs that may arise in each particular application of the leakproof sealing device of the invention.

Each of the diaphragms M1 and M2 of both embodiments of the leakproof sealing device of the invention, shown in FIGS. 1 and 2 and 3 and 4, respectively, is essentially cylindrical. Both longitudinal ends are formed with respective recesses defining, at one end, a convex surface 7 and, at the other of said ends, a concave surface 9.

The convex surface 7 of the diaphragms M1 and M2 is formed with an axial sealing extension 9. It is cylindrical and dimensioned functionally to mate with the discharge ports 3a and 4a, in the embodiment illustrated in FIGS. 1 and 2 and with the discharge ports 3a' and 4a' in the embodiment shown in FIGS. 3 and 4.

In the embodiment of the device of the invention shown in FIGS. 1 and 2, the diaphragms M1 and M2 are arranged in the central chamber CC in such a way that the concave surfaces 8 thereof are longitudinally aligned opposite to each other. The respective axial sealing extensions 9 resiliently bear permanently on the discharge ports 3a and 4a, respectively, as shown in FIG. 1.

The perimetral slot 10 formed in the central chamber CC partly houses and retains both diaphragms M1 and M2. They define two half chambers SC1 and SC2 which are not in fluid communication with each other through the directing chamber CD, as shown in FIGS. 1 and 2.

In the embodiment of the device of the invention shown in FIGS. 3 and 4, in a similar way as described above for the embodiment shown in FIGS. 1 and 2, the diaphragms M1 and M2 are arranged in the central chamber CC', in such a way that the respective concave surfaces 8 thereof are longitudinally aligned opposite to each other. The axial sealing extensions 9 resiliently bear permanently on the discharge ports 3a' and 4a', respectively as shown in detail in FIG. 3.

The central chamber CC' is formed with the perimetral slot 10' which partly houses and retains both diaphragms M1 and M2. They define two half chambers SC1' and SC2' which are not in fluid communication with each other through the direction chamber CD, as shown in FIGS. 3 and 4.

The operation of the leakproof sealing device of the invention according to FIGS. 1 and 2 is as follows:

FIG. 1 shows how, when the suction and discharge impeller i stopped, the axial sealing extensions 9 of the diaphragms M1 and M2 resiliently bear against the discharge ports 3a and 4a, respectively. In this way, it is impossible for the cleaning liquid contained in the auxiliary liquid reservoir to flow by simple head level difference to the discharge passages 3 and 4, since it is prevented by the diaphragms M1 and M2 stoppering said discharge ports 3a and 4a.

FIG. 2 shows how the cleaning liquid pumped towards the half chamber SC2 by the suction and discharge impeller in one of the directions of rotation acts on the diaphragm M2. This action is resiliently to deform said diaphragm M2 so that the cleaning liquid may flow through the discharge port 4a and flow along the passage 4 to the corresponding points of use.

Simultaneously, the resilient deformation of the diaphragm M2 compresses the diaphragm M1 so that the latter has an increased sealing action on the discharge port 3a. In this way, the cleaning liquid contained in the passage 3 is not subjected to any pressure caused by operation of the impeller, thereby avoiding the uncontrolled projection of cleaning liquid on surfaces which have not been selected by the user for cleaning.

When the suction and discharge impeller stops rotating and, consequently, the action of the cleaning liquid on the diaphragm M2 ceases, the latter resiliently recovers the position shown in FIG. 1, with the initial service state of the device being recovered.

Rotation of the suction and discharge impeller in the opposite direction to the one described above produces a symmetrical operation of the leakproof sealing device. I.e. in this case it will be the diaphragm M1 which is subjected to the action of the cleaning liquid pumped by the impeller, so that said liquid will leave the directing chamber CD through the discharge passage 2 and the diaphragm M2 will be compressed so as to increase the sealing action thereon against the port 4a of the discharge passage 4. When the impeller stops rotating, the diaphragm M1 will return resiliently to the position shown in FIG. 1.

The operation of the embodiment of the leakproof sealing device of the invention according to FIGS. 3 and 4, in which the diaphragms M1 and M2 work horizontally, is as follows:

FIG. 3 shows the position adopted by the diaphragms M1 and M2 when the suction and discharge impeller is stopped. In this position, the axial sealing extensions 9 of the diaphragm M1 and M2 stopper, respectively, said discharge ports 3a' and 4a'.

Furthermore, FIG. 4 shows how, when the suction and discharge impeller is rotating in one direction, the inflow of the cleaning liquid through the passage 1' into the half chamber SC2' causes resilient deformation of the diaphragm M2 and consequently the cleaning liquid flows through the discharge passage 4' to the corresponding points of use.

When the suction and discharge impeller stops, the diaphragm M2 resiliently recovers the position shown in FIG. 3.

Rotation of the suction and discharge impeller in the opposite direction to the one described above produces a symmetrical operation of the leakproof sealing device. I.e. the inflow of the cleaning liquid into the half chamber SC1' will cause the resilient deformation of the diaphragm M1 and, consequently, the cleaning liquid will flow through the discharge passage 3' and the diaphragm M2 will be compressed so as to increase the sealing action against the discharge port 4a. When the suction and discharge impeller stops rotating, the diaphragm M1 will return resiliently to the position shown in FIG. 3.

As stated above, FIGS. 5 to 10 of the drawings show other embodiment of the double diaphragm leakproof sealing device for electric windscreen washer pumps of the invention. Complementing the embodiments of the device of the invention shown in FIGS. 1 to 4, they incorporate compensating means for the loss of resilience of the two constituents diaphragms.

In the following description of the embodiments of the leakproof sealing device of the invention shown in FIGS. 5 to 10, the devices are applied to the embodiment of the directing chamber CD shown as an example in FIGS. 1 and 2. This embodiment of the directing chamber CD corresponds to the cases in which the two constituent diaphragms of the device of the invention operate in the vertical position. Logically, the embodiments of the device of the invention shown in FIGS. 5 to 10 are equally applicable without any loss of operativeness to those cases in which the constituent diaphragms of the device according to the invention operate horizontally, i.e. in directing chambers CD such as the one detailed as embodiment in said FIGS. 3 and 4.

The embodiment of the device of the invention shown in FIGS. 1 and 2 and the embodiments of the device shown in FIGS. 5 to 10 are provided with equivalent means. Thereby, for the purposes of a clearer understanding, both in the following description and in said FIGS. 5 to 10, such equivalent means will bear the same reference numbers. Even where the differences of structure or shape not affecting the invention are to be appreciated, the same reference numbers are maintained.

Figure 5:
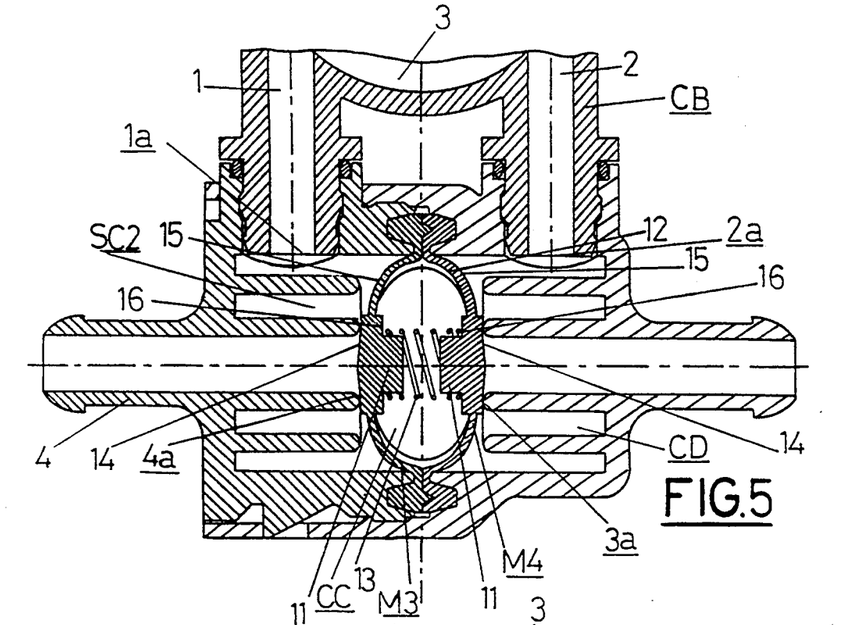
FIG. 5 is a cross section view of a further embodiment of the device of the invention incorporating compensating means.
Figure 6:
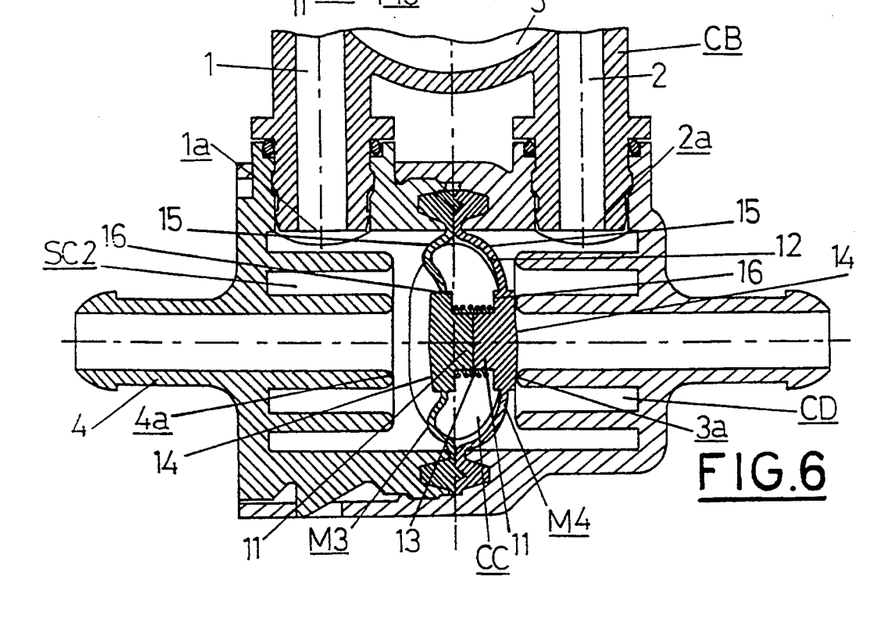
FIG. 6 is a cross section view of the embodiment of the device of the invention shown in FIG. 5 illustrating the action of the cleaning liquid on one of the device's diaphragms.

FIGS. 5 and 6 show another embodiment of the leakproof sealing device of the invention. In this embodiment the two constituent diaphragms, which are references with M3 and M4, are housed, as described for the preceding embodiments, in the intermediate central chamber CC of the directing chamber CD formed in the lower end of the pump body CB.

According to this other embodiment of the device of the invention shown in FIGS. 5 and 6, the resilience loss compensating means comprises two pressure extensions 11, formed respectively and symmetrically on the concave surface sides 12 of the diaphragms M3 and M4, and the pressure spring 13.

As shown in FIGS. 5 and 6, the pressure extensions 11 are generally cylindrical and are arranged coaxially to the axial sealing extensions 14 formed on the convex surface sides 15 of both diaphragms M3 and M4.

FIGS. 5 and 6 show how the pressure spring 13 is located between both diaphragms M3 and M4 and is permanently under compression. Its ends bear against the intermediate shoulders 16 which are defined by the pressure extensions 11 and, consequently, on the concave surface sides 12 of said diaphragms M3 and M4.

The portion of the pressure extensions 11 comprised between the free end and the intermediate shoulder 16 is snugly fitted in the pressure spring 13. In this way, as shown in FIGS. 5 and 6, it is positionally fixed.

Figure 7:
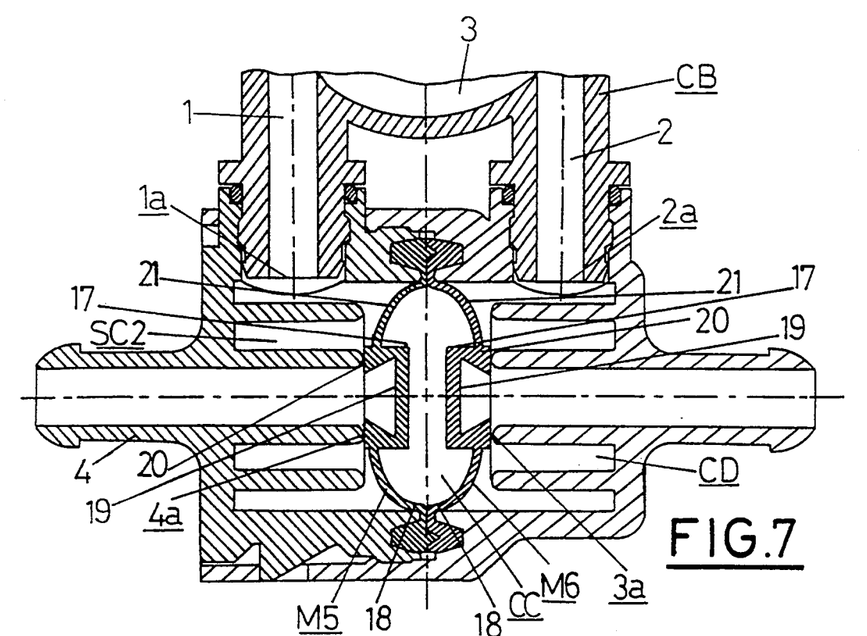
FIG. 7 is a cross section view of a further embodiment of the device of the invention incorporating compensating means.
Figure 8:
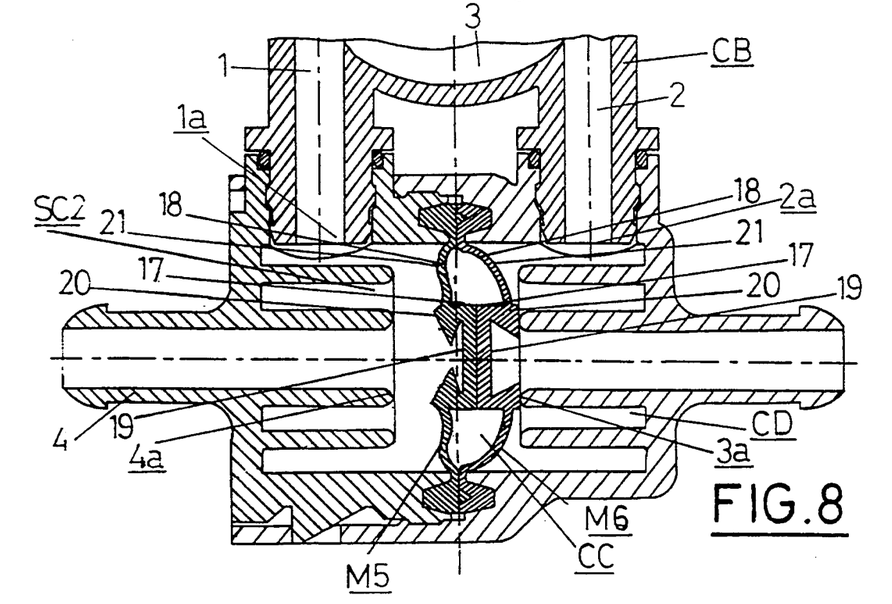
FIG. 8 is a cross section view of the embodiment of the device of the invention shown in FIG. 7 illustrating the action of the cleaning liquid on one of the device's diaphragms.

FIGS. 7 and 8 show another embodiment of the leakproof sealing device of the invention. In this embodiment, the same as described in the preceding embodiments, the two vertical constituent diaphragms, referenced with M5 and M6, are housed in the intermediate central chamber CC of the directing chamber CD of the lower end of the pump body CB.

According to this further embodiment of the device of the invention shown in FIGS. 7 and 8, the resilience loss compensating means comprises two pressure extensions 17 which are formed respectively and symmetrically on the concave surface sides 18 of the diaphragms M5 and M6. It also comprises two large axial recesses 19 which are formed respectively on axial sealing extensions 20 of the convex surface sides 21 of the diaphragms M5 and M6.

As shown in FIGS. 7 and 8, the pressure extensions 17 are essentially cylindrical in shape and are arranged coaxially relative to the axial sealing extensions 20 formed on the convex surface sides 1 of both diaphragms M5 and M6.

The large axial recesses 19 formed on the axial sealing extensions 20 of the diaphragms M5 and M6 are essentially frustoconical in shape. Their smaller ends are opposite, respectively, the cleaning liquid discharge ports 4a and 3a.

Figure 9:
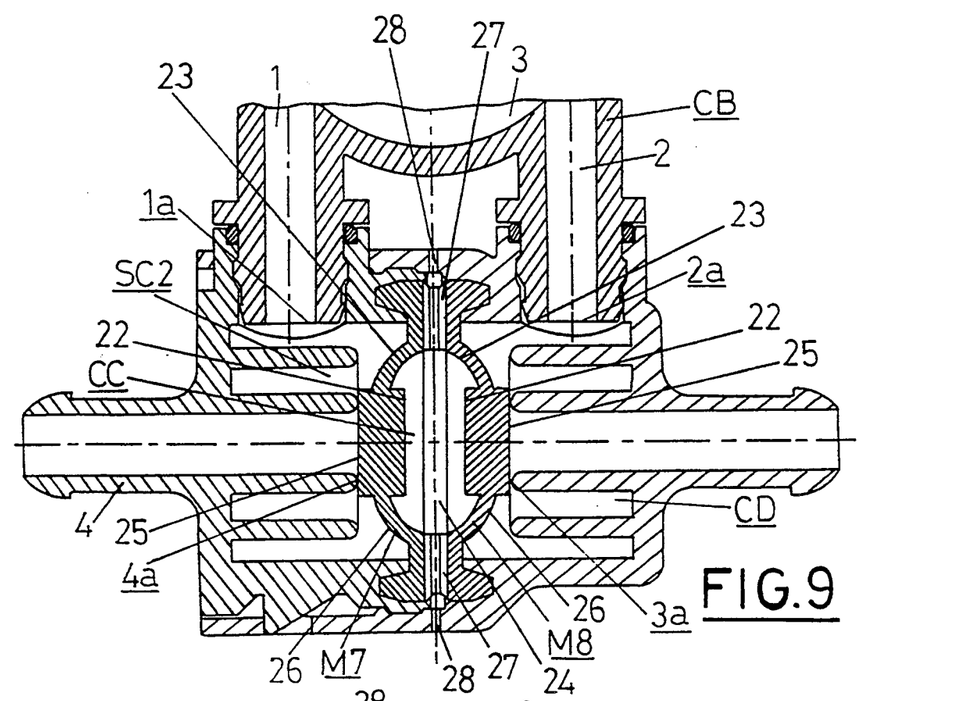
FIG. 9 is a cross section view of a further embodiment of the device of the invention incorporating compensating means.
Figure 10:
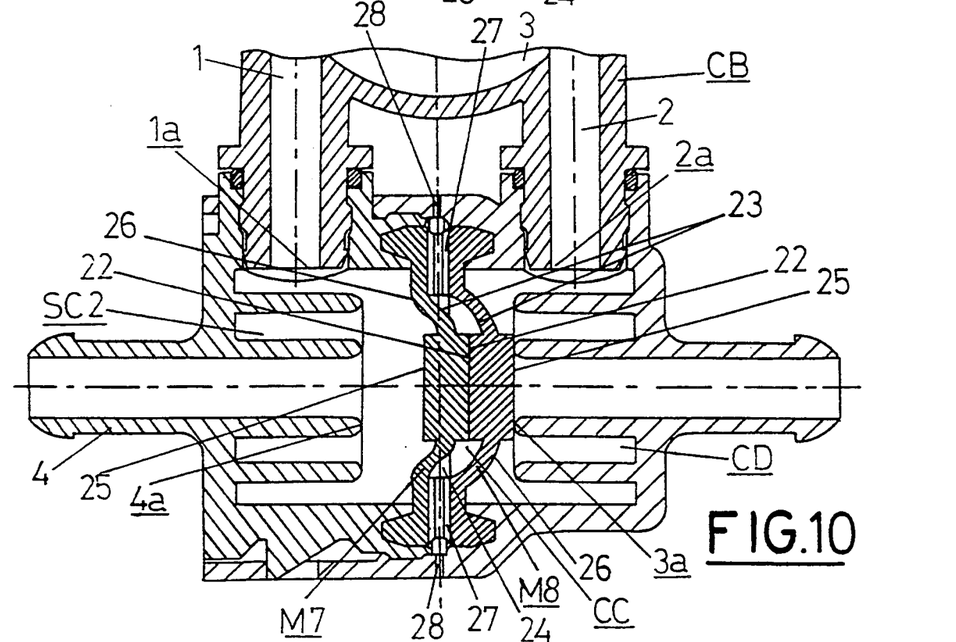
FIG. 10 is a cross section view of the embodiment of the device of the invention shown in FIG. 9 illustrating the action of the cleaning liquid on one of the device's diaphragms.

FIGS. 9 and 10 show a further embodiment of the leakproof sealing device of the invention. In this embodiment, like has been described for the preceding embodiments, the two constituent diaphragms thereof, which are referenced as M7 and M8, are housed in the intermediate central chamber CC of the directing chamber CD at the lower end of the pump body CB.

According to this further embodiment of the device of the invention shown in FIGS. 9 and 10, the resilience loss compensating means comprises the two pressure extensions 22 which are respectively and symmetrically formed on the concave surface sides 23 of the diaphragms M7 and M8. It also comprises the O-ring 24 which is located between the inner edges of both diaphragms M7 and M8.

As shown in FIGS. 9 and 10, the pressure extensions 22 are essentially cylindrical are arranged coaxially relative to the axial sealing extensions 25 which are formed on the convex surface sides 26 of both diaphragms M7 and M8.

In this embodiment, the O-ring 24 is directly compressed by the inner edges of the diaphragms M7 and M8. Logically, it may occupy any other intermediate position between both diaphragms M7 and MS, without affecting its operativeness.

FIGS. 9 and 10 show how the O-ring 24 has two radial through holes 27. Through corresponding through holes 28 formed in the lower end of the pump body CB, they act as communication with the atmosphere, setting up direct communication between the intermediate central chamber CC and the environment.

The embodiment of the leakproof sealing device of the invention shown in FIGS. 5 and 6 operates as follows:

FIG. 5 shows how, when the suction and discharge impeller is stopped the axial sealing extensions 14 block the cleaning liquid discharge ports 4a and 3a, respectively, by the resilient action of the diaphragms M3 and M4 and by the action of the pressure spring 13.

FIG. 6 shows the action exerted by the cleaning liquid pumped into the half chamber SC2 by the suction and discharge impeller in one direction of rotation on the diaphragm M3 and on the pressure spring 13. This action consists of a resilient deformation or opening stroke of the diaphragm M3, freeing the discharge port 4a. Through this port and through the passage 4 the cleaning liquid is directed to the points of use and in a shortening of the pressure spring 13. The opening stroke of the diaphragm M3 is limited by the pressure extension 11 of the diaphragm M4.

When the suction and discharge impeller stops and the pressure of the cleaning liquid against the convex surface 15 of the diaphragm M3 is freed, the latter resiliently recovers the initial position illustrated in FIG. 5. This resilient recovery or closing stroke is reinforced by the action of the pressure spring 13 working permanently in compression.

Rotation of the suction and discharge impeller in the opposite direction to the one described above causes a symmetrical operation of the leakproof sealing device. I.e., to summarize, the opening stroke of the diaphragm M4 will be restricted by the pressure extension 11 of the diaphragm M3 and the closing action of the diaphragm M4 on the discharge port 3a will also be obtained by way of the pressure spring 13.

The operation of the embodiment of the leakproof sealing device of the invention shown in FIGS. 7 and 8 is as follows:

FIG. 7 shows how, when the suction and discharge impeller is stopped the axial sealing extensions 29 block the cleaning liquid discharge ports 4a and 3a, respectively, by the resilient action of the diaphragms M5 and M6.

FIG. 8 shows the action exerted by the cleaning liquid pumped into the half chamber SC2 by the suction and discharge impeller in one direction of rotation on the diaphragm M5. This action consists of a resilient deformation or opening stroke of the diaphragm M5, freeing the discharge port 4a. Through this port and through the passage 4 the cleaning liquid is directed to the points of use. The opening stroke of the diaphragm M5 is limited by the pressure extension 17 of the diaphragm M6.

The presence of the axial recesses 19 confers a semi-articulated structure on the axial sealing extensions 20 of the diaphragms M5 and M6, with a tendency to flex in their weaker areas when subjected to external actions, such as the deformation caused by the action of the cleaning fluid. It is precisely the tendency to recover the position of least effort that will help effectively in the recovery of the sealing position of the diaphragm when the cleaning liquid ceases to flow and, therefore, the pressure against the diaphragm is relieved.

When the suction and discharge impeller stops and the pressure of the cleaning liquid against the convex surface 21 of the diaphragm M5 is freed, the latter resiliently recovers the initial position illustrated in FIG. 7. This resilient recovery or closing stroke is reinforced by the action of the axial frustoconical recess 19 formed on the sealing extension 20 of the diaphragm M5.

Rotation of the suction and discharge impeller in the opposite direction to the one described above causes a symmetrical operation of the leakproof sealing device. I.e., to summarize, the opening stroke of the diaphragm M6 will be restricted by the pressure extension 17 of the diaphragm M5 and the closing action on the discharge port 3a will be reinforced by the axial frustoconical recess 19 formed on the axial sealing extension 20 of the diaphragm M6.

The operation of the embodiment of the leakproof sealing device of the invention shown in FIGS. 9 and 10 is as follows:

FIG. 9 shows how, when the suction and discharge impeller is stopped the axial sealing extensions 25 of the diaphragms M7 and M8 block the discharge ports 4a and 3a, respectively, by their own resilient action.

FIG. 10 shows the action exerted by the cleaning liquid pumped into the half chamber SC2 by the suction and discharge impeller in one direction of rotation on the diaphragm M7. This action consists of a resilient deformation or opening stroke of the diaphragm M7, freeing the discharge port 4a through which and through the passage 4 the cleaning liquid is directed to the points of use and of the partial expulsion of the air contained in the intermediate central chamber CC to the environment through the through holes 27 and 28 of the O-ring 24 and of the pump body CB, respectively. The opening stroke of the diaphragm M7 is limited by the pressure extension 22 of the diaphragm M8.

when the suction and discharge impeller stops and the pressure of the cleaning liquid against the convex surface 26 of the diaphragm M7 is relieved, the latter resiliently recovers the initial position illustrated in FIG. 9. This resilient recovery or closing stroke is reinforced by the action of air in the intermediate central chamber CC through the through holes 27 and 28 caused by the depressing action of the resilient recovery of the diaphragm M7.

Rotation of the suction and discharge impeller in the opposite direction to the one described above causes a symmetrical operation of the leakproof sealing device. I.e., to summarize, the opening stroke of the diaphragm M8 will be restricted by the pressure extension 22 of the diaphragm M7 and the closing action on the discharge port 3a will be reinforced by way of the depressing action of the diaphragm M8.

According to the tests performed, the leakproof sealing device of the invention shown in FIGS. 1 to 4, i.e. the embodiments of the device in which the diaphragms M1 and M2 do not have resilience loss compensating means, the number of working cycles that said diaphragms M1 and M2 attain without loss of operativeness of the device is approximately 3,000, as stated above.

On the other hand, in tests performed with the leakproof sealing device of the invention shown as example in FIGS. 5 to 10, i.e. the embodiments of the leakproof sealing device in which the constituent diaphragms comprise resilience loss compensating means, the number of working cycles which said diaphragms attain, in any of the embodiments, without loss of operativeness of the device is at least 30,000. This result is far superior to the 3,000 working cycles attained by the diaphragms M1 and M2 of the leakproof sealing device shown in FIGS. 1 to 4 which do not have resilience loss compensating means.

It will be understood that each of the elements described above, or two or more together, may also find a useful application in other types of constructions differing from the types described above.

While the invention has been illustrated and described as embodied in a double diaphragm leakproof sealing device for electric windscreen washer pumps, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A double diaphragm leakproof sealing device for electric windshield washer pumps, comprising means forming a pump chamber and a directing chamber arranged at a distance from said pump chamber; means forming inlet passages which communicate said directing chamber with said pump chamber and have inlet passage ports opening independently in said directing chamber; means forming two cleaning liquid discharge passages having discharge passage ports and arranged in said directing chamber so that in correspondence with said inlet passage ports they define an intermediate central chamber; two diaphragms composed of resilient materials and located in said intermediate central chamber, said diaphragms being arranged one near the other so as to define in said directing chamber two half chambers, one of said inlet passage ports and one of said discharge passage ports being located in each of said half chambers so that there is no fluid communication between said half chambers across said diaphragm, each of said diaphragms having one side provided with a convex surface and another side provided with a concave surface, said one sides of said diaphragms provided with said convex surface having axial sealing extensions formed in correspondence with said discharge passage ports which they face and against which they bear when a cleaning liquid is not being pumped from said pumping chamber, said diaphragms being arranged in said intermediate central chamber so that said concave surfaces are opposite to one another and located at relatively short distance from one another, said diaphragms having means for compensating a loss of resilience, said compensating means including pressure extensions arranged coaxially relative to said coaxial sealing extensions and formed symmetrically with said other sides provided with concave surfaces, said pressure extensions having free ends which are spaced from one another so that when the cleaning liquid is pumped from the pumping chamber in one direction or another direction, resilient deformation or opening stroke of a corresponding one of said diaphragms during opening of an associated one of said discharge passage ports is limited by said pressure extension of another of said diaphragms, and when the pumping of the cleaning liquid is stopped, the resilient deformation or closing stroke of said diaphragm blocking said discharge passage port is reinforced; and auxiliary recovering means for reinforcing said blocking, said auxiliary recovery means including a compression spring arranged between said diaphragms coaxially relative to said axial sealing extensions, said compression spring being permanently compressed and having ends bearing on said one sides of said diaphragms provided with concave surfaces, said compression spring having a working position fixed by said pressure extensions on said concave surfaces, said pressure extensions are fully inserted in said compression spring of said auxiliary recovery means.

2. A double diaphragm leakproof sealing device for electric windshield washer pumps, comprising means forming a pump chamber and a directing chamber arranged at a distance from said pump chamber; means forming inlet passages which communicate said directing chamber with said pump chamber and have inlet passage ports opening independently in said directing chamber; means forming two cleaning liquid discharge passages having discharge passage ports and arranged in said directing chamber so that in correspondence with said inlet passage ports they define an intermediate central chamber; two diaphragms composed of resilient materials and located in said intermediate central chamber, said diaphragms being arranged one near the other so as to define in said directing chamber two half chambers, one of said inlet passage ports and one of said discharge passage ports being located in each of said half chambers so that there is no fluid communication between said half chambers across said diaphragm, each of said diaphragms having one side provided with a convex surface and another side provided with a concave surface, said one sides of said diaphragms provided with said convex surface having axial sealing extensions formed in correspondence with said discharge passage ports which they face and against which they bear when a cleaning liquid is not being pumped from said pumping chamber, said diaphragms being arranged in said intermediate central chamber so that said concave surfaces are opposite to one another and located at relatively short distance from one another, said diaphragms having means for compensating a loss of resilience, said compensating means including pressure extensions arranged coaxially relative to said coaxial sealing extensions and formed symmetrically with said other sides provided with concave surfaces, said pressure extensions having free ends which are spaced from one another so that when the cleaning liquid is pumped from the pumping chamber in one direction or another direction, resilient deformation or opening stroke of a corresponding one of said diaphragms during opening of an associated one of said discharge passage ports is limited by said pressure extension of another of said diaphragms, and when the pumping of the cleaning liquid is stopped, the resilient deformation or closing stroke of said diaphragm blocking said discharge passage port is reinforced; and auxiliary recovering means for reinforcing said blocking, said auxiliary recovery means including a compression spring arranged between said diaphragms coaxially relative to said axial sealing extensions, said compression spring being permanently compressed and having ends bearing on said one sides of said diaphragms provided with concave surfaces, said compression spring having a working position fixed by said pressure extensions on said concave surfaces, said pressure extensions being partially inserted in said compression spring of said auxiliary recovery means.

3. A double diaphragm leakproof sealing device for electric windshield washer pumps, comprising means forming a pump chamber and a directing chamber arranged at a distance from said pump chamber; means forming inlet passages which communicate said directing chamber with said pump chamber and have inlet passage ports opening independently in said directing chamber; means forming two cleaning liquid discharge passages having discharge passage ports and arranged in said directing chamber so that in correspondence with said inlet passage ports they define an intermediate central chamber; two diaphragms composed of resilient materials and located in said intermediate central chamber, said diaphragms being arranged one near the other so as to define in said directing chamber two half chambers, one of said inlet passage ports and one of said discharge passage ports being located in each of said half chambers so that there is no fluid communication between said half chambers across said diaphragm, each of said diaphragms having one side provided with a convex surface and another side provided with a concave surface, said one sides of said diaphragms provided with said convex surface having axial sealing extensions formed in correspondence with said discharge passage ports which they face and against which they bear when a cleaning liquid is not being pumped from said pumping chamber, said diaphragms being arranged in said intermediate central chamber so that said concave surfaces are opposite to one another and located at relatively short distance from one another, said diaphragms having means for compensating a loss of resilience, said compensating means including pressure extensions arranged coaxially relative to said coaxial sealing extensions and formed symmetrically with said other sides provided with concave surfaces, said pressure extensions having free ends which are spaced from one another so that when the cleaning liquid is pumped from the pumping chamber in one direction or another direction, resilient deformation or opening stroke of a corresponding one of said diaphragms during opening of an associated one of said discharge passage ports is limited by said pressure extension of another of said diaphragms, and when the pumping of the cleaning liquid is stopped, the resilient deformation or closing stroke of said diaphragm blocking said discharge passage port is reinforced; and auxiliary recovering means for reinforcing said blocking, said auxiliary recovery means including axial recesses provided on said axial sealing extensions of said another sides of said diaphragms having convex surfaces.

4. A double diaphragm leakproof sealing device for electric windshield washer pumps, comprising means forming a pump chamber and a directing chamber arranged at a distance from said pump chamber; means forming inlet passages which communicate said directing chamber with said pump chamber and have inlet passage ports opening independently in said directing chamber; means forming two cleaning liquid discharge passages having discharge passage ports and arranged in said directing chamber so that in correspondence with said inlet passage ports they define an intermediate central chamber; two diaphragms composed of resilient materials and located in said intermediate central chamber, said diaphragms being arranged one near the other so as to define in said directing chamber two half chambers, one of said inlet passage ports and one of said discharge passage ports being located in each of said half chambers so that there is no fluid communication between said half chambers across said diaphragm, each of said diaphragms having one side provided with a convex surface and another side provided with a concave surface, said one sides of said diaphragms provided with said convex surface having axial sealing extensions formed in correspondence with said discharge passage ports which they face and against which they bear when a cleaning liquid is not being pumped from said pumping chamber, said diaphragms being arranged in said intermediate central chamber so that said concave surfaces are opposite to one another and located at relatively short distance from one another, said diaphragms having means for compensating a loss of resilience, said compensating means including pressure extensions arranged coaxially relative to said coaxial sealing extensions and formed symmetrically with said other sides provided with concave surfaces, said pressure extensions having free ends which are spaced from one another so that when the cleaning liquid is pumped from the pumping chamber in one direction or another direction, resilient deformation or opening stroke of a corresponding one of said diaphragms during opening of an associated one of said discharge passage ports is limited by said pressure extension of another of said diaphragms, and when the pumping of the cleaning liquid is stopped, the resilient deformation or closing stroke of said diaphragm blocking said discharge passage port is reinforced; and auxiliary recovering means for reinforcing said blocking, said auxiliary recovery means including an O-ring arranged in said intermediate central chamber of said directing chamber between inner edges of said diaphragms, said O-ring having throughholes communicating with atmospheric pressure so as to establish a direct communication between said intermediate central chamber and environment.

5. A double diaphragm leakproof sealing device as defined in claim 4, wherein the pump has a pump body member having holes, said througholes of said O-ring communicating with atmospheric pressure through said holes in said pump body member.

* * * * *